April 17, 1962
W. L. ROBERTS ET AL
3,030,620
STROBING CIRCUIT
Filed Aug. 31, 1949
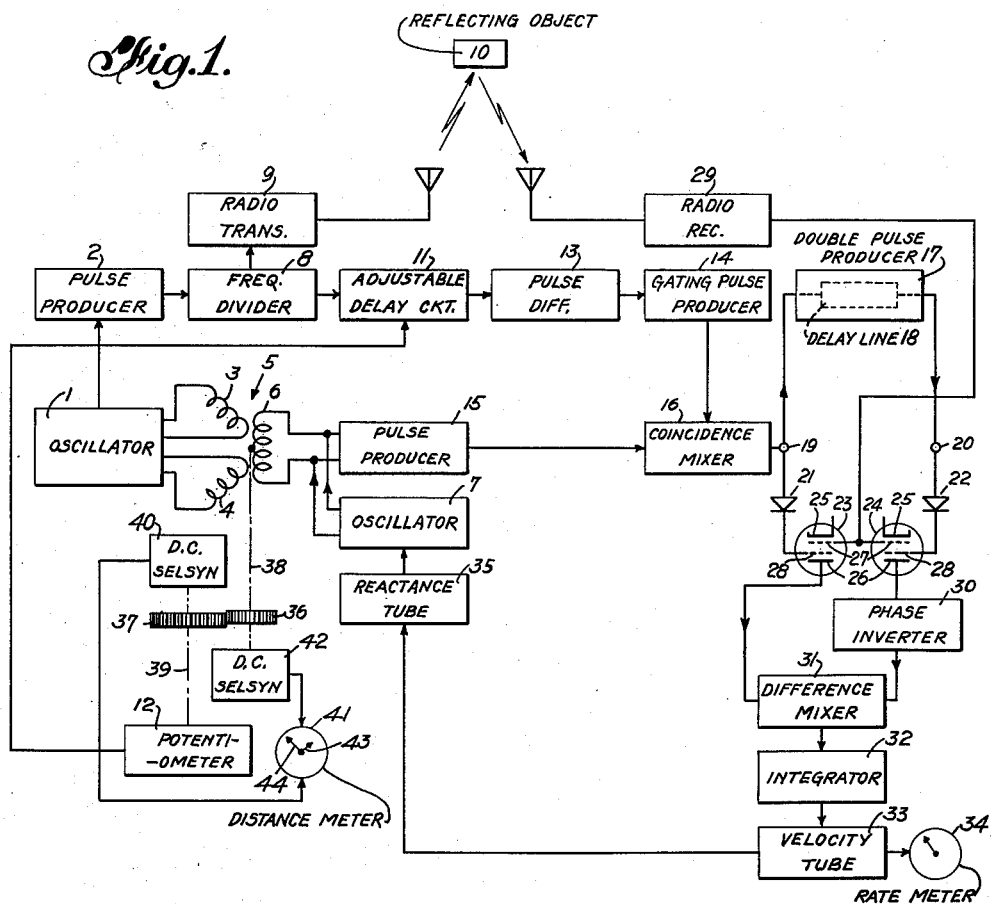
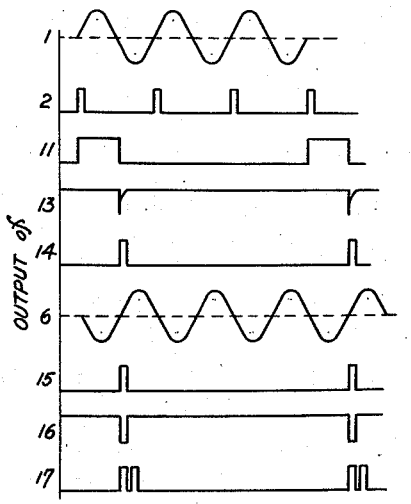
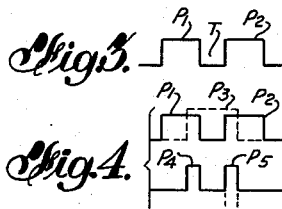
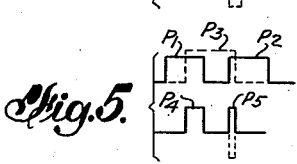
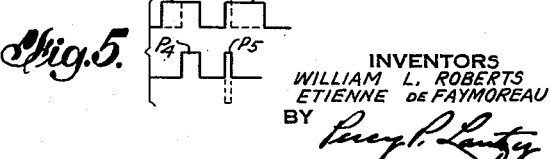
INVENTORS
WILLIAM L. ROBERTS
ETIENNE de FAYMOREAU
BY
ATTORNEY United States Patent Office 3,030,620
Patented Apr. 17, 1962

3,030,620
STROBING CIRCUIT
William Leslie Roberts, Pittsburgh, Pa., and Etienne de Faymoreau, Nutley, N.J., assignors to International Telephone and Telegraph Corporation, a corporation of Maryland
Filed Aug. 31, 1949, Ser. No. 113,372
14 Claims. (Cl. 343—13)

This invention relates to radio-ranging systems and more particularly to arrangements for continuously measuring the distance between objects experiencing relative movement.

A principal object of the invention is to provide an improved automatic phase comparison arrangement for echo-ranging systems and the like.

Heretofore, various radar arrangements have been proposed for measuring distance employing in most cases a controllable local phase delayer energized with the transmitted radar pulses, whose adjustment is automatically effected, for example, by a reversible electric motor to bring the direct and echo pulses into a predetermined phase relation whereupon the motor is brought to rest. It has also been proposed heretofore to employ coincidence circuits for comparing the phase relations of the direct and echo pulses. In these prior arrangements, the motor which controls the phase adjustment has been of the conventional type and was used merely as a source of motive power for adjusting the phasing mechanism. In some cases this motor was coupled through a "Selsyn" repeater to another motor which operated the phasing control mechanism.

We have found that it is possible to use a single motor device for controlling the phasing mechanism, which motor also acts as a generator of the comparison pulses.

Accordingly, one of the principal objects of this invention is to provide a distance measuring system of the echo wave type, and having an electric motor to set the usual phase adjustment and comparison networks, which motor also acts as a comparison pulse generator.

Another object is to provide a distance measuring system of the echo-wave type employing an electric motor which is connected to operate as a control source for the generation of local gating or comparison pulses of the double pulse kind, and also as a means for automatically setting the phasing mechanism to bring the double comparison pulses into a predetermined phase relation to the echo pulses.

A feature of the invention relates to a distance measuring system of the echo-pulse type, wherein a goniometer device, such for example as a rotary transformer, is used to control the generation of the local pulses for phase comparison with the echo pulses.

Another feature relates to a system for comparing the phases of two sets of pulses using a device of the goniometer or rotary transformer type whose speed of rotation is automatically adjusted in accordance with the phase relation between the two sets of pulses.

A further feature relates to a novel arrangement for comparing the phases of two pulses one of which, for example, may be an echo pulse, and the other of which may be a double reference pulse for phase comparison; in conjunction with a goniometer device which generates a variable reference frequency in accordance with the time or phase overlap of the echo pulse and said double reference pulse.

A still further feature relates to an improved automatic radar-ranging system employing a double reference pulse phase comparison arrangement under control of a radio goniometer.

The above-mentioned and other features and objects of this invention and the manner of attaining them will become more apparent and the invention itself will be best understood, by reference to the following description of an embodiment of the invention taken in conjunction with the accompanying drawing, wherein:

FIG. 1 is a schematic wiring and structural diagram of a system embodying features of the invention.

FIG. 2 illustrates the wave shapes derived at different points in the diagram of FIG. 1.

FIGS. 3, 4 and 5 are graphs explanatory of the operation of the invention.

Referring to FIG. 1 of the drawing, the block 1 represents any well-known source of sine wave oscillations such as are used in radar systems, and whose frequency is chosen so that its periodicity bears the desired relation with the unit of radar range for which the system is to be employed. For example, oscillator 1 may have a frequency of 8.088 kilocycles per second for a radar range unit of 10 nautical miles, and for example 91.3 kilocycles per second for a radar range unit of 1 land mile. This oscillator is used in the well-known manner to provide the usual radar pulses, and for this purpose it feeds into a pulse producer 2 of known design for producing square-topped pulses. In accordance with one feature of the invention, the oscillator 1 also feeds in phase quadrature the stator or field windings 3, 4, of a goniometer device 5 whose rotor winding 6 is arranged to be excited under control of another local variable frequency source 7 as will be described hereinbelow.

The pulses from device 2 are passed through a pulse divider 8 of known design, whose pulse output determines the pulse recurrence rate of the system. The pulses from divider 8 modulate a radio transmitter 9, whereby pulses of radio frequency energy are radiated to the object or obstruction 10 from which they are to be reflected for distance measuring purposes or the like. In the well-known manner, therefore, the pulses radiated from transmitter 9 bear a strict phase relation with the marker pulses produced by device 2.

A portion of the output of divider 8 is locally fed to a triggered variable delay circuit 11 which has a phase or delay-adjusting member controlled by the goniometer 5. In the drawing, this control of the phase delay in circuit 11 is obtained by a suitable potentiometer 12 which is connected to the delay circuit 11. It will be understood, of course, that the delay of network 11 should be capable of adjustment from zero range to the maximum operating range of the system. The back or trailing edge of each of the square-topped pulses from device 11 is differentiated in any well-known differentiating network 13 which feeds a gating pulse producer 14 of known design such as for example a triggered multivibrator circuit.

From the rotor 6 of goniometer device 5, there is obtained a sine wave whose phasing with relation to the waves from oscillator 1 produces orientation of rotor winding 6 with respect to stator windings 3, 4. This sine wave is fed to a pulse producer 15, which like device 2, produced square-topped pulses rigidly fixed in phase with respect to the sine wave from rotor 6. The pulses from device 14 and the pulses from device 15 are fed to any well-known coincidence mixer 16 whereby when the pulses from devices 14 and 15 are substantially coincident in time, a negative pulse is produced at the output of device 16. This negative pulse is then applied to a double or "strobing" pulse producer 17, which for example, may include a delay line 18 upon which the negative pulses are impressed to produce at the output of line 17 corresponding time displaced pulses. The undelayed input pulses therefore appear at terminal 19 and the delayed pulses appear at terminal 20. Thus, as shown in FIG. 3 each pulse from device 15 is converted into a pair of square-topped "strobing" pulses P1, P2, which are spaced apart by a given time interval. These pairs of pulses of course are regularly recurrent and are compared in phase with the echo pulses picked up by the radio receiver 29 which responds to the waves reflected from the obstruction 10. It will be understood that any well-known means for converting each negative pulse from device 16 into a pair of similar spaced or "strobing" pulses may be employed.

The two "strobing" pulses at terminals 19 and 20 are applied to respective rectifiers 21, 22, which are connected to respective coincidence detectors 23, 24, of any well-known kind. These detectors are schematically illustrated in the form of electron tubes each having an electron-emitting cathode 25, an anode 26, and two intervening control grids 27, 28. The control grids 27 are connected to the output of the receiver 29 while the rectifiers 21 and 22 are connected respectively to the control grids 28. If each pulse P3 from the receiver 29 symmetrically overlaps the corresponding pair of "strobing" pulses P1, P2, as shown in FIG. 4, there will be developed corresponding pulses P4, P5, of equal width. If however, the echo pulse P3 unsymmetrically overlaps the "strobing" pulses P1, P2, as shown in FIG. 5, the pulses P4, P5, will be of different width. In order to measure and integrate the difference in width of these pulses, the pulses P5 are passed through a phase inverter network 30 of any known type and these phase inverted pulses from the detector 24 together with the non-inverted pulses from detector 23 are applied to a combining network 31 having a suitable integrating circuit 32 connected to its output.

The integrated differential output from device 32 is then applied to a so-called velocity tube 33 which develops at its output a direct voltage which is proportional to the phase relationship of the "strobing" pulses P1, P2, and the echo pulse P3. The D.C. signal from device 33 can then be applied to control a voltmeter 34 to indicate the rate at which the delay circuit 11 must be adjusted to provide symmetrical coincidence of the echo and strobe pulses.

A portion of the D.C. signal from the device 33 is also applied to a reactance tube 35 so that the effective reactance of this tube is varied in accordance with the level of the D.C. signal from device 33. Since reactance tubes and their frequency controlling characteristics are very well known in the art, further description thereof is not required herein.

The tube 35 is connected to the oscillator 7 in the well-known manner to control the frequency of this oscillator in accordance with the varied reactance of tube 35, and the output of oscillator 7 is connected across the rotor winding 6. As a result, the rotor 6 will rotate at a speed determined by the relative frequency of the sine wave from source 1 and the frequency of the oscillations from source 7. When the "strobing" pulses P1, P2, are locked to the echo pulse P3, and the reflecting object is fixed with respect to the transmitting station, then the oscillator 7 will generate a sine wave at the same frequency as the oscillator 1. If the echo pulses P3 are moved "inwards" with respect to the pulses from the transmitter 9, for example if the obstruction 10 is "approaching" the transmitter 9, then the oscillator 7 will generate at a higher frequency than the oscillator 1. On the other hand, if the echo pulses are moving "outwards," for example by reason of the obstruction 10 "receding" from the transmitter, then oscillator 7 will generate at a lower frequency than the oscillator 1.

The rotor 6 of the goniometer 5 is mechanically geared through reduction gearing 36, 37 in such a manner that when the potentiometer 12 is adjusted as a result of rotating shaft 38, the phase shift that the goniometer produces between the sine wave from source 1 and the sine wave from rotor 6, is the same phase shift that the potentiometer 12 produces in the variable delay circuit 11. The ratio of the gears 36 and 37 will of course depend upon various considerations, such for example as the total range over which the system is to be employed, the frequency of oscillator 1, the dead angle of the potentiometer 12, etc. The shaft 39 which controls potentiometer 12 can also be connected to a "Selsyn" repeater 40 of the direct current type to control the coarse settings of a suitable distance meter 41, and the shaft 38 can be likewise connected through a suitable "Selsyn" repeater 42 of the direct current type to control the fine setting of the meter 41. The meter 41 may comprise for example, a pair of pointers 43, 44, each pointer being appropriately driven by the corresponding "Selsyn" repeater.

The searching function of the mechanism above described is entirely automatic. Thus when the "strobing" pulses P1, P2, do not overlap the echo pulses P3, the D.C. voltage from the device 33 is such as to cause the oscillator 7 to generate at a maximum frequency difference with respect to the frequency of oscillator 1. Since the rate of rotation of the rotor 6 is a function of the difference in frequency between the oscillators 1 and 7, the said rotor therefore rotates at its maximum or searching speed. When however, a time coincidence has been obtained between the "strobing" pulses P1, P2, and the echo pulse P3, the frequency of the oscillator 7 is automatically brought close to that of oscillator 1 so that the rotor 6 rotates to produce the "strobing" pulses in symmetrical synchronism with the echo pulses.

While we have described above the principles of our invention in connection with specific apparatus, it is to be clearly understood that this description is made only by way of example and not as a limitation to the scope of our invention.

What is claimed is:

1. A distance measuring system of the echo pulse type, comprising a master oscillator of fixed phase, a radar transmitter for transmitting pulses locked in phase with said master oscillator, a first pulse path to the master oscillator and fed with oscillations therefrom, said first pulse path having an adjustable phase delay circuit, a goniometer device, a local oscillator of controllable frequency, means connecting said goniometer device to said master oscillator and to said local oscillator to cause the rotor of the goniometer device to rotate at a speed determined by the frequency difference between said two oscillators, a pulse producer connected to the output of the goniometer and to a second pulse path, means to combine the pulses from both said pulse paths to produce resultant pulses when the pulses from both paths are in timed coincidence, means to convert the resultant pulses into corresponding double pulses, means to compare the timing of the echo pulses with said double pulses to produce a control voltage determined by the amount of overlap of said resultant pulses with said double pulses, and means to apply said control voltage to vary said local oscillator until its frequency is approximately the same as said master oscillator.

2. A distance measuring system according to claim 1, in which a voltmeter is connected to said timing comparison means to produce an indication of the rate of change of phase between said echo pulses and said double pulses.

3. A distance measuring system according to claim 1, in which a distance indicating meter is connected to the rotor of said goniometer.

4. A distance measuring system according to claim 1, in which said goniometer controls two shafts operating at fixed but different speeds from the goniometer rotor, one of said shafts operating a coarse indicator of a distance meter and the other of said shafts operating a fine indicator of said distance meter.

5. A system according to claim 4, in which said other shaft is connected to a potentiometer for controlling the amount of phase delay in said phase delay circuit.

6. A system of the type described, comprising a pair of pulse transmission paths of different electrical lengths, a master oscillator feeding both said paths with the pulses in one path locked to the master oscillator, a radar transmitter controlled by the pulses in said one path for reflection from a distant object, a phase delay device in the other path, a goniometer device having its input connected to said master oscillator and its output connected to a pulse producer to produce double control pulses at the same frequency as said master oscillator but displaced in phase under control of the setting of said goniometer, a local source of adjustable frequency also feeding said goniometer to cause the rotor of said goniometer to rotate at a speed determined by the frequency difference between said master oscillator and said local oscillator, means connected to the output of said delay device to produce gating pulses, a coincidence mixer connected for excitation by said gating pulses and by said control pulses to produce resultant pulses, a pair of rectifiers, means to convert each control pulse into a set of double pulses, means to apply one pulse of each double pulse set to one rectifier, means to apply the other pulse of each set to the other rectifier, means to apply the reflected pulses and the output of one rectifier to a coincidence detector, means to simultaneously apply the reflected pulses and the output of the other rectifier to another coincidence detector, means to invert the phase of one detector output, means to produce a control voltage representing the differential between said two detector outputs, and means to apply said control voltage to said local source of oscillations to control the rotation of the goniometer rotor until the reflected pulses symmetrically overlap said double pulses.

7. A system according to claim 6, in which said control voltage is a direct current voltage, and a voltmeter is provided which is controlled by said direct current voltage to indicate the rate of change of phase between said reflected pulses and said double pulses.

8. A system according to claim 6, in which the goniometer of said rotor is connected to operate the fine indicator of a distance meter and is connected through a gear train to operate the coarse indicator of the said distance meter, said gear train also being connected to operate a potentiometer connected to said phase delay device 9. A system for comparing the relative phases of two signals arriving over respective paths of different electrical lengths, comprising a master oscillator for generating a frequency of fixed phase, means to derive a first set of pulses from said oscillator and locked in phase therewith, means to derive a second set of pulses from said oscillator and including a rotatable element whose angular orientation determines the phase of said second set of pulses with respect to said oscillator, an oscillator of controllable frequency to control the rate of rotation of said rotatable element, means to compare the timing of both sets of pulses to produce a resultant signal proportional to their difference in timing, means to apply said resultant signal to said oscillator of controllable frequency to control the rotation of said element to bring said two sets of pulses into a predetermined timed relation, means to transmit said first set of pulses over one of said paths to an object for reflection therefrom, means to receive said reflected pulses, means controlled by said second set of pulses for producing sets of double pulses, said timing comparison means including circuit arrangements for producing said resultant signal in accordance with the timed overlap of each of said reflected pulses with a set of double pulses.

10. A system for comparing the relative phases of two signals arriving over respective paths of different electrical lengths, comprising a master oscillator for generating a frequency of fixed phase, means to derive a first set of pulses from said oscillator and locked in phase therewith, means to derive a second set of pulses from said oscillator and including a rotatable element whose angular orientation determines the phase of said second set of pulses with respect to said oscillator, means to compare the timing of both sets of pulses to produce a resultant signal proportional to their difference in timing, means to apply said resultant signal to control the rotation of said element to bring said two sets of pulses into a predetermined timed relation, means to transmit said first set of pulses over one of said paths to an object for reflection therefrom, means to receive said reflected pulses, means controlled by said second set of pulses for producing sets of double pulses, said timing comparison means including circuit arrangements for producing said resultant signal in accordance with the timed overlap of each of said reflected pulses with a set of double pulses, said rotatable element being the rotor of a rotary transformer, means for applying said first set of pulses to a third path having an adjustable phase delay circuit therein, means to adjust the said phase delay device under control of said rotor to bring the pulses in the second and third paths into timed coincidence to produce resultant pulses, and means to convert said resultant pulses into said double pulses.

11. A system for comparing the relative phases of two signals arriving over respective paths of different electrical lengths, comprising a master oscillator for generating a frequency of fixed phase, means to derive a first set of pulses from said oscillator and locked in phase therewith, means to derive a second set of pulses from said oscillator and including a rotatable element whose angular orientation determines the phase of said second set of pulses with respect to said oscillator, means to compare the timing of both sets of pulses to produce a resultant signal proportional to their difference in timing, means to apply said resultant signal to control the rotation of said element to bring said two sets of pulses into a predetermined time relation, means to transmit said first set of pulses over one of said paths to an object for reflection therefrom, means to receive said reflected pulses, means controlled by said second set of pulses for producing sets of double pulses, said timing comparison means including circuit arrangements for producing said resultant signal in accordance with the timed overlap of each of said reflected pulses with a set of double pulses, said rotatable element being the rotor winding of a goniometer device having a pair of stator windings, another oscillator of controllable frequency, means to apply the oscillations from said master oscillator and from said other oscillator to respective of said windings to control the rate of rotation of said rotor, and means to apply said resultant signal to control the frequency of said other oscillator until it is approximately the same as the master oscillator frequency.

12. A system according to claim 11, in which the frequency from said other oscillator is applied to said rotor winding.

13. A system for comparing the relative phases of two signals arriving over respective paths of different electrical lengths, comprising a master oscillator for generating a frequency of fixed phase, means to derive a first set of pulses from said oscillator and locked in phase therewith, means to derive a second set of pulses from said oscillator and including a rotatable element whose angular orientation determines the phase of said second set of pulses with respect to said oscillator, means to compare the timing of both sets of pulses to produce a resultant signal proportional to their difference in timing, means to apply said resultant signal to control the rotation of said element to bring said two sets of pulses into a predetermined time relation, means to transmit said first set of pulses over one of said paths to an object for reflection therefrom, means to receive said reflected pulses, means controlled by said second set of pulses for producing sets of double pulses, said timing comparison means including circuit arrangements for producing said resultant signal in accordance with the timed overlap of each of said reflected pulses with a set of double pulses, said rotatable element being the rotor of a goniometer, means for applying a portion of the master oscillations to a third path, an adjustable phase delay device in said third path, means for adjusting said phase delay device under control of said rotor, means to produce resultant pulses from the relative timed coincidence of the pulses from the second and third paths, and means controlled by said resultant signal for bringing the said resultant pulses into symmetrical timed coincidence with the said reflected pulses.

14. A system for comparing the relative phases of two signals arriving over respective paths of different electrical lengths, comprising a master oscillator for generating a frequency of fixed phase, means to derive pulses under control of said oscillator, means to apply said pulse to both said paths, one of said paths having means to adjustably delay the phase of the pulses therein, a motor device for adjusting said delay, said motor device also generating a second set of pulses during its rotation and of variable phase with respect to said oscillator, means to combine the pulses from said delay means with said second set of pulses to produce resultant pulses, means to compare the timing of said resultant pulses with the pulses received from the other of said paths to produce a control voltage, an oscillator of controllable frequency to control the rate of rotation of said motor device and means to apply said control voltage to control the frequency of said oscillator of controllable frequency to control the speed of said motor device, said means to compare the timing comprising a double pulse producer connected to said combining means, coincidence detector means, means to transmit pulses locked in phase with said master oscillator over the other of said paths, and means to impress upon said coincidence detector the pulses arriving from said other path and also the said double pulses to produce said control voltage.

References Cited in the file of this patent

UNITED STATES PATENTS

| | | |
|---|---|---|
| 2,422,074 | Bond | June 10, 1947 |
| 2,455,265 | Norgaard | Nov. 30, 1948 |
| 2,534,329 | Wilkerson | Dec. 19, 1950 |

FOREIGN PATENTS

| | | |
|---|---|---|
| 582,492 | Great Britain | Nov. 19, 1946 |
| 124,653 | Australia | July 3, 1947 |
| 599,602 | Great Britain | Mar. 16, 1948 |